United States Patent
Riedl et al.

(10) Patent No.: US 6,719,298 B2
(45) Date of Patent: Apr. 13, 2004

(54) BONDED PISTON SEAL FOR POWER STEERING

(75) Inventors: Daniel L. Riedl, Lake in the Hills, IL (US); John A. Wilkins, Ypsilanti, MI (US)

(73) Assignee: SKF USA Inc., Elgin, IL (US)

( * ) Notice: Subject to any disclaimer, the term of this patent is extended or adjusted under 35 U.S.C. 154(b) by 0 days.

(21) Appl. No.: 10/047,149

(22) Filed: Jan. 14, 2002

(65) Prior Publication Data

US 2003/0132577 A1 Jul. 17, 2003

(51) Int. Cl.$^7$ .............................. F16J 9/12; F16J 15/32
(52) U.S. Cl. ................... 277/435; 277/437; 277/551; 277/572
(58) Field of Search ...................... 277/435, 436, 277/437, 551, 562, 565, 572, 575–7, 390, 394, 396, 397, 925; 92/240–4, 254, 253

(56) References Cited

U.S. PATENT DOCUMENTS

| | | | | |
|---|---|---|---|---|
| 2,431,653 A | * | 11/1947 | Volpin ........................ | 92/251 |
| 2,600,516 A | * | 6/1952 | Pielop, Jr. ................... | 277/437 |
| 2,808,301 A | * | 10/1957 | Bowerman ................... | 92/244 |
| 2,808,302 A | * | 10/1957 | Bowerman ................... | 92/244 |
| 2,983,125 A | * | 5/1961 | Peickii et al. ............... | 464/173 |
| 3,175,474 A | * | 3/1965 | Eickmann .................... | 92/168 |
| 3,587,397 A | * | 6/1971 | Hagopian .................... | 91/399 |
| 3,980,004 A | * | 9/1976 | Jones et al. .................. | 92/182 |
| 4,111,441 A | * | 9/1978 | Sick et al. ................... | 277/566 |
| 4,114,898 A | * | 9/1978 | Bainard et al. .............. | 277/551 |
| 4,178,002 A | * | 12/1979 | Kayser ........................ | 277/436 |
| 4,281,590 A | * | 8/1981 | Weaver ........................ | 92/244 |
| 4,304,414 A | * | 12/1981 | Forch .......................... | 277/575 |
| 4,351,228 A | * | 9/1982 | Schultz et al. ................ | 92/128 |
| 4,773,363 A | * | 9/1988 | Stritzke ...................... | 123/188.6 |
| 4,790,138 A | * | 12/1988 | Steer .......................... | 60/578 |
| 5,014,599 A | * | 5/1991 | Kocsis et al. ................. | 92/84 |
| 5,178,243 A | * | 1/1993 | Hamada et al. ............. | 188/322.17 |
| 5,286,038 A | * | 2/1994 | Abraham et al. ............ | 277/568 |
| 5,363,744 A | * | 11/1994 | Pichler ....................... | 92/242 |
| 5,421,591 A | * | 6/1995 | Katzensteiner .............. | 277/550 |
| 6,170,992 B1 | * | 1/2001 | Angelo et al. ............... | 384/477 |
| 6,293,558 B1 | * | 9/2001 | Crapart ....................... | 277/552 |
| 6,363,833 B1 | * | 4/2002 | Stoll ........................... | 92/136 |

* cited by examiner

Primary Examiner—Alison K. Pickard
(74) Attorney, Agent, or Firm—Vedder Price Kaufman & Kammholz

(57) ABSTRACT

A seal assembly which acts as a piston in a vehicle power steering unit. The seal includes a casing and an elastomeric seal body and is affixed to a movable rack at two attachment points. One point is the tail portion of an axial flange swaged into a groove in the rack, and a second part of the same axial flange has a groove for retaining a locking ring in a second groove in the rack. The rack moves within a housing having a first bore, a counterbore, and an enlarged bore. The seal comprises two oppositely facing lips and a lip body bonded to a radial flange of the seal assembly and engaging the enlarged bore which divides the space into two pressurizable fluid receiving cavities. An auxiliary seal is seated in the counterbore and seals the first bore. The seal assembly has a nose portion which engages the auxiliary seal to fully seat it in the counterbore. The nose portion, in one case, is a separate axially extending plastic piece that seats in a groove in the seal body. In another embodiment, the nose portion is a separate metal ring, and in still other embodiments, the nose portion is made up of extensions of the seal casing.

16 Claims, 4 Drawing Sheets

BONDED PISTON SEAL FOR POWER STEERING

BACKGROUND OF THE INVENTION

The present invention relates generally to oil seals and sealed mechanisms, and more particularly, to oil seals which are retained in position on their inside diameter on a longitudinally movable rod or rack, and which have two oppositely directed sealing lips on their outside diameter. The seal thus also acts as a piston in this application. The application for such seals is primarily as an improvement in seals used to isolate two separate but variable volume chambers in a power steering system.

The present practice in a power steering application is to have a movable rack with an intermediate portion which is operated by a pinion, with either end of the rack serving to move the steering arms of a vehicle. The rack itself is moved by hydraulic force exerted to either side of the seal or piston, with the force being created by the power steering pump. The power steering module includes a sealed housing surrounding this rack, and the housing includes two pressure ports, one on either side of the seal. Depending on which side of the seal is pressurized, the seal, and hence the rack, is pushed to one side or the other in keeping with the desires of the operator. The rack is also sealed with auxiliary seals at both ends, since the rack as a whole must move back and forth with respect to the sealed cavity.

In a typical application, which includes a rack longitudinally movable within the housing (laterally as respects the vehicle), it is desired to subdivide the hollow annular space between the housing and the rack into two chambers by means of a seal or piston which effectively keeps the chambers separate and which also, when acted upon by the hydraulic force generated by the power steering pump, moves the rack in either direction, depending upon the side, if any, which is pressurized.

The typical seal presently used in this application is a four element seal, including a one piece forging, which includes a body having an extended steel nose portion, a formation that retains a steel ring in a first groove on the rack, an o.d. seal-receiving groove, and a tail portion of reduced thickness which is permanently swaged or staked into a second groove in the rack. The steel ring and the swaged end forced into the second groove cooperate to locate the body on the rack and keep it from moving in either direction.

The o.d. seal-receiving groove in the forged body includes an interior elastomeric O-ring and an exterior PTFE or "Teflon" ring of rectangular cross-section engaging the cylindrical wall of the housing. The rubber O-ring supplies a radially outward load to the PTFE ring. The forging o.d. is very close to the bore, but does not contact it. The nose portion of the forging is used one time only to seat a seal in a counterbore in the closed end portion of the housing.

In use, several disadvantages of this type of rack seal exist. The first is the matter of cost. Because the principal portion of the seal is a forging, it costs more than a stamping or part made from sheet metal. However, it is thought to be necessary because of the fact that it positively locates the O-ring and PTFE member. This requires very fine tolerances in the dimension of the groove. One problem with the PTFE outer seal is that it tends to extrude through the gap between the forging and the cylindrical surface of the housing, especially after a time and in the presence of high pressure hydraulic loads. The O-ring may take a compression set after a time and thus tend to aggravate this problem. Another difficulty is that of quality, with one supplier being used for the rubber and PTFE elements, and another for the forged components.

Accordingly, in view of these and other disadvantages and shortcomings of the prior art, it would be advantageous to provide an improved seal for this and other related applications. For example, it would be also advantageous, if possible, to use a stamping as the casing unit in place of the forging presently used. It would be also advantageous if a twin lip seal could be applied to the stamping in a single operation to create two oppositely facing primary sealing lips.

Another advantage would be to provide a readily deformable flange on a stamping which could be swedged or staked into the groove on the rack shaft. Still further, another advantage would be, in one embodiment, to create an integral rubber formation which could accommodate a snap-in plastic nose portion for seating an auxiliary seal which is required on the "blind" end of the housing. It would be advantageous if the stamping could have a rolled or otherwise formed groove in the casing to engage the retainer ring and insure that the casing unit maintained its position on the rack.

In view of the shortcomings of the prior art, it is therefore an object of the present invention to provide an improved, new design for a steering rack seal.

Another object of the present invention is to provide a seal or piston which utilizes bonded two rubber lips as the primary seal members.

A still further object of the invention is to provide a seal or piston which is secured by two different means to the rack and which contains a casing made from a stamping or drawing rather than a forging.

Still another object of the invention is to provide a dual lip seal which, on the inside surfaces of the lips, contains a contoured or beaded portion.

Yet another object of the invention is to provide a seal with a pair of lips separated by a center portion, with the center portion having beads extending radially outwardly on its outer diameter surface.

A further object of the invention is to provide a seal which includes an installation nose in the form of a snap-in plastic ring fitting in a groove in the intermediate diameter of the seal and engaging portions of the seal lip body spaced from the sealing lips proper.

A still further object of the invention is to provide the seal with dual sealing lips and also containing an elastomeric seal body which includes an inside diameter cylindrical surface, which surface is adapted for an interference fit with a metal casing extending axially outwardly thereof and serving to act as the nose portion for installing an auxiliary seal.

Another object of the invention is to provide a seal with a nose portion made from a folded over portion of the casing and on which the outside diameter of the casing has bonded to it a seal body with a dual lip configuration.

Still another object of the invention is to provide a seal with a casing having one end with a tail portion adapted to be pressed into a groove on the rack, an intermediate portion having a bright portion which also serves as the bonding portion for a dual lip peripheral seal and still further includes an axially extending portion serving to engage and seat an auxiliary seal.

These and other objects and advantages of the invention are achieved in practice by providing an improved seal or piston unit for a rack or other movable rod, the seal including a tail portion adapted to be swaged into a groove in the rack or rod, a dual lip seal portion bonded to a part of the casing, a groove in the casing for accommodating a retainer ring, and, in several embodiments, various forms of an integral or separable nose portions to assist in installing another auxiliary seal in the application.

The manner in which these and other objects are achieved in practice will become more fully apparent when considered in conjunction with a description of the preferred embodiments of the invention set forth by way of example and shown in the accompanying drawings, in which like reference numbers indicate corresponding parts throughout.

DETAILED DESCRIPTION OF THE PREFERRED EMBODIMENTS OF THE INVENTION

While the invention may be embodied in a number of different forms, and may be used in several applications, a description will be given of several forms of the invention wherein it is embodied as the piston in a power steering application. Because the cavity in which the rack moves must be sealed at both ends, the seal performing this function is referenced to herein as an "auxiliary" seal, while the seal of the invention, which also functions as a piston, is referred to as simply a "seal" or as a "piston".

Figure 1:
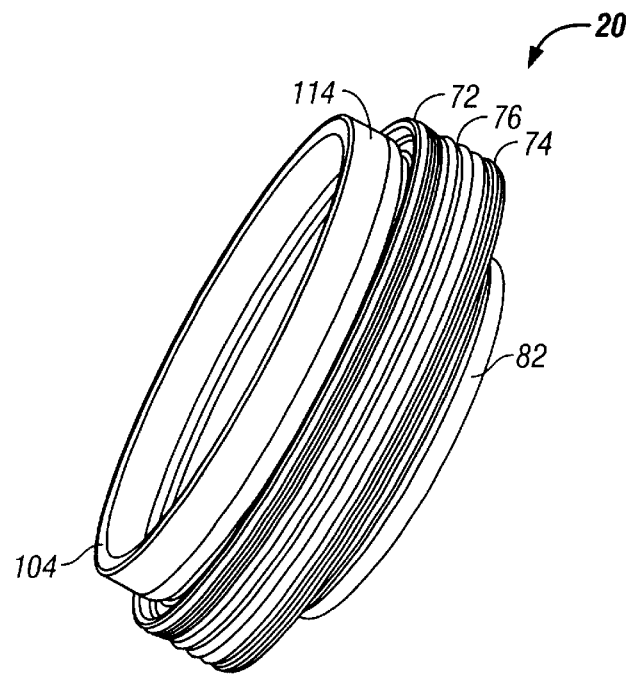
FIG. 1 is a perspective view of the exterior of one form of seal or piston made according to the present invention, and shown removed from the application.
Figure 2:
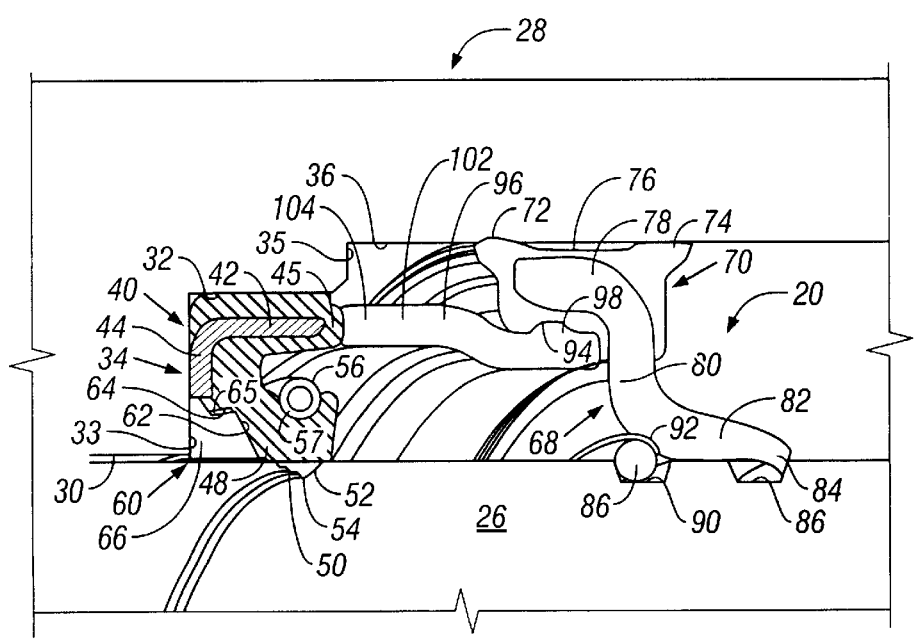
FIG. 2 is an enlarged perspective view showing the seal or piston of FIG. 1 in the bottom half-section, in its position installing an auxiliary seal which is being pushed "home" by the principal seal into one end of the housing in which the seal is used.
Figure 3:
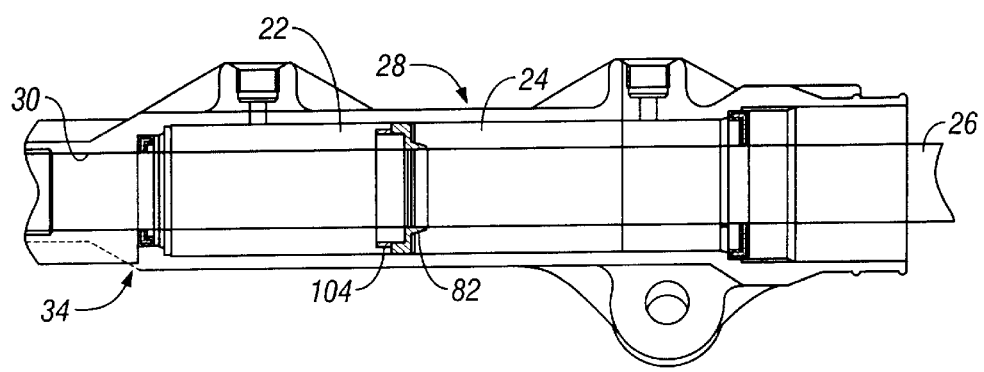
FIG. 3 is a vertical sectional view, partly diagrammatic in character, showing some of the elements of a power steering system incorporating the seal or piston of the invention.

Referring first to FIGS. 1–3, one form of seal or piston of the invention generally designated 20 is shown to be installed in an application which seals opposite sides 22, 24 of variable volume chambers lying on either side of the seal 20. Hydraulic force generated by a power steering pump acts on either side of the piston or seal 20 thereby moving the rack 26 with which the seal is immovably associated. The application, therefore, is shown to include a housing generally designated 28, having a bore 30 through which the rod or rack 26 moves in use, a counterbore 32 having an end wall 33 in which an auxiliary, high pressure seal generally designated 34 is positioned. A shoulder 35 terminating in a cylindrical wall or bore 36 communicates with the counterbore 32 and forms the outside diameter wall 36 of the chambers 22, 24.

One feature of the invention is the ability of the seal or piston to seat a high pressure seal 34 in the counterbore 32 lying at the closed or blind end of the housing 28.

Accordingly, and referring now in particular to FIG. 2, the high pressure seal 34 in the smaller of the two counterbores 32 includes a casing unit generally designated 40 having an axial flange 42 and a radial flange 44. These are surrounded by a body of rubber having an end portion 45 surrounding the axial flange 42. On the radially inner side of the casing 40 is a lip body of rubber generally designated 48 having an air side and an oil side surfaces 50, 52 which meet along a generally circular locus of intended contact 54 with the rack 26.

A garter spring 56 is disposed in a groove 57 to urge the lip body 48 into snug engagement onto the rack 26. It is important in seals of this kind that are exposed to very high pressure, that they include an anti-extrusion insert generally designated 60, preferably made from nylon, and which includes an angled face 62 and which fits in a contoured recess 64 in the seal body 48. The back wall 33 of the counterbore 32 serves as a stop for the anti-extrusion insert 66, which includes a groove 65 so that the insert generally designated 60 may be snapped into place from which it will not escape.

The seal or piston generally designated 20 accordingly includes several principal parts including a casing generally designated 68, and a lip body generally designated 70. The lip body includes two lips 72, 74 adapted to contact the cylindrical wall 36 of the housing 28. A slightly radially reduced surface 76 lies between the lips 72, 74. The body of rubber 70 is bonded to an S-shaped casing having a generally axial outer diameter flange 78, a generally radial flange 80, and a generally axially extending, inside diameter flange 82. The end portion 84 of this flange 82 is somewhat thinned and is swaged or deformed in substantially fluid-tight relation into a contoured groove 86 in the rack 26.

A cylindrical locking ring 88 lies in a second groove 90 which is spaced closely from the first groove 86. A partially circular or grooved indentation 92 on the axial flange 82 forms a snug retainer for the locking ring 88. As a result of the swaging of the tail portion 84 into the groove 86 and the cylindrical locking ring 88 in its associated groove 90, the stamping or casing generally designated 68 is immovable.

In addition to the two lips 72, 74 which are formed on the lip body 70, an important feature of this embodiment is the groove 94 formed on the radially inner surface of the lip body 70. This groove provides a snap-in fit for the smaller diameter portion 100 of the ring generally designated 96 which joins a larger diameter portion 102 of the ring 96 having a tip portion at its end 104 to assist in installing the seal 34. The tip portion 104 engages the solid rubber portion 45 of the seal body 48 and urges the seal 34 into its "home" or fully seated position.

In this embodiment, the nose portion 96 is made separately from the seal or piston portion, and the nose portion 96 is preferably made from a relatively hard plastic material. However, once the molded portions of the seal 20 have been manufactured, the seal 20 is fitted with the casing sliding over the rack. The nose assembly 96 is then snap fitted into the groove 94 with which its bead or rib 98 registers to create a very tight fit. The retaining ring 88 is inserted in the groove 90, and the groove 92 then retains the ring snugly in place. Thereafter, the tail portion 84 is deformed into the groove 86, creating a tight fit for the stamping which is then prevented from any movement in either direction. This is important in view of the forces that are involved against the piston or seal, in this case, hydraulic forces sufficient to move the rack 26 and hence the wheels of the vehicle.

When the nose portion 104 of the flange 102 engages the end portion of the seal body 45, the seal 34 is pushed into the counterbore 32, until the radial flange of the casing 44 firmly engages the end wall 33 of the counterbore 32. Thereafter, the seal 20 having been used to seat the auxiliary seal 34, the seal 20 and the rack 26 are withdrawn as a unit, and from then on, the seal acts as a piston, as hydraulic fluid is forced into the spaces 22, 24, causing the rack to move either way. Of course, when the rack is not acted upon, the rack stays in the same position, and the wheels of the vehicle also maintain whatever position in which they are placed.

In this respect, and particularly in the claims, the seal between the rod or rack and the seal or piston is a stationary seal which is substantially leak-free. By "substantially" is meant that this seal may weep or bleed a very small amount of fluid into the low pressure side, inasmuch as there is pressurized fluid being supplied to it at all times. Of course, if this leakage were substantial, it may compromise the accuracy of the steering process, since the leakage would then cause the piston to be acted upon by lower pressure from the high pressure side. Regarding any leakage between the lip and the housing where a dynamic or movable seal takes place, the same considerations apply; a slight amount of leakage here would also not be harmful, but a significant amount of course would be.

Figure 4:
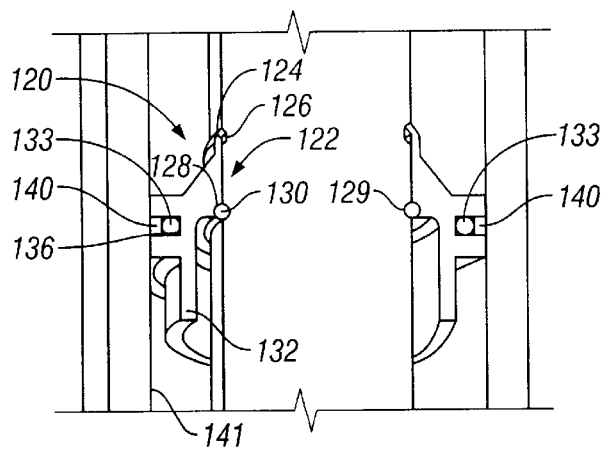
FIG. 4 is a partial perspective view of a seal or piston of the prior art, over which the present invention is an improvement.

FIG. 4 illustrates at least one prior art device which has been used. Here, a sealed unit generally designated 120 has included a forging 122 having a reduced thickness tail portion 124 forced or swaged into a groove 126 formed in the rack. At the same time, a semi-circular groove 128 in the body 122 engaged the locking ring 130 which is seated in the groove 129. The groove 129 in the rack and the groove 128 in the body, cooperate with the locking ring 130 to be sure the forging cannot move. A nose portion 132 having a similar function to the nose 104 is provided, except that it must be made of the same forged material as the piston or seal. The outer diameter of the forging 134 includes a groove 136 which accommodates an elastomeric O-ring 138 on the inside and which acts radially on a rectangular seal 140 made from a fluorocarbon polymer. The radial O-ring or other elastomeric ring pushes outwardly on the fluorocarbon polymer, urging it into contact with the cylinder wall 141. There is, however, no lip portion on the seal. This arrangement leaves the only centering force on the forging to be the fluorocarbon ring. The nose 132 acts in generally the same way as its counterpart 104.

Figure 5:
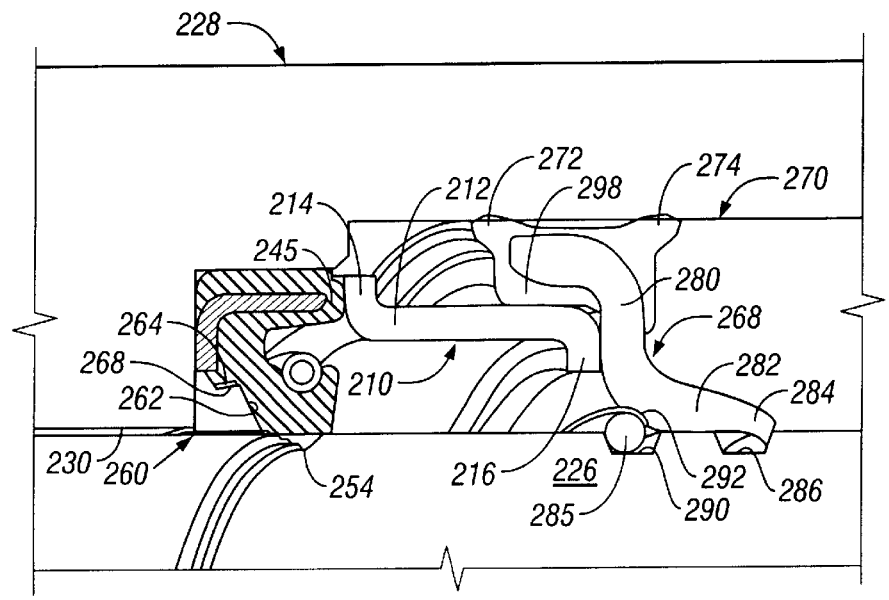
FIG. 5 is a partial perspective view of another embodiment of the invention, also shown installing the auxiliary seal in a counterbore in the rack housing.

Referring now to another embodiment of the invention, FIG. 5 shows a construction of a rack 226 which is slidable within a housing 228 having a cylindrical opening 230 in one end. In this embodiment, everything is the same as its counterpart in FIGS. 1 and 2, including the axial flange 282 and the deformable tail portion 284 which is forced into the groove 286. The groove 292 in the casing generally designated 268 for seating the steel locking ring 285 in the groove 290 are also the same as their counterpart, as are the configuration of the casing 268 and the seal body 270 with lips 272, 274.

However, the portion of the elastomeric body is smooth and cylindrical on the inside, that is, there is no bead present. The elastomeric surface 298 is sized so as to receive a second casing generally designated 210 with a slight but definite interference fit. This casing 210 includes a horizontal or axial portion 212, a radially outwardly extending flange 214 and a radially inwardly extending flange 216. The flange 216 abuts the center portion 280 of the casing so there is excellent metal-to-metal contact. The outboard or upturned radial flange 214 abuts the rubber body 245. The anti-extrusion insert generally designated 260 and, the inclined surface 262 and the enlarged diameter portion 264 and the bead 268 are the same as their counterparts in the earlier figure, as are the components making up the locus of contact 254 between the primary lip and the rack 226.

Figure 6:
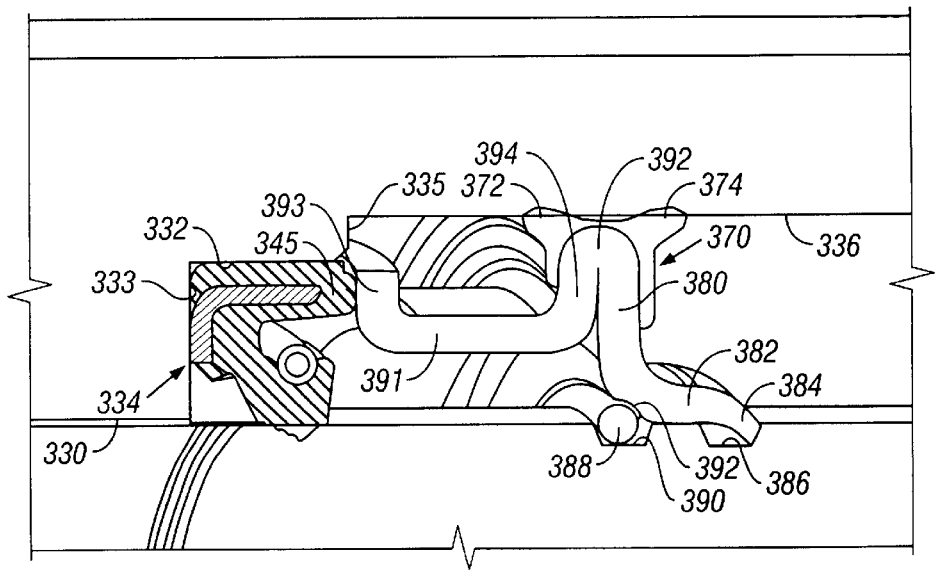
FIG. 6 is a partial perspective view of a further embodiment of the invention utilizing a stamping or casing of the invention having two purposes, namely, to serve as the bonding flange and also as the installation flange for the auxiliary seal used with the seal of the invention.

Referring now to FIG. 6, another embodiment having several things in common with the earlier embodiments, but differing therefrom in significant detail is shown. In this embodiment, there is shown a bore 330 having a counterbore 332 connected to the principal bore by an end face 333, and having a principal bore or wall 336 terminated in an end face 335. The seal generally designated 334 is similar in all respects to its counterpart shown in the earlier figures.

However, the casing of the novel seal which was shown in the earlier embodiment is similar in that it includes a generally axial flange 382 including a thinned down portion 384 adapted to be inserted in the groove 386. The other end of the axial flange 382 or the end which is opposite the end 384 includes a groove 392 for accommodating a steel locking ring 388 which is situated in the groove 390.

The remainder of the stamping, however, is different. In addition to having the radial portion 380, it has a bight portion 392 at the outer diameter thereof, which is then folded back on itself at 394 before progressing axially outwardly at 391 and terminating in an upturned or radial flange portion 393. This rather convoluted form of the casing has certain advantages. It may be used to bond the rubber portion 370 with lips 372, 374 in the same manner as the earlier embodiments. However, the extended axial flange 391 is fixed to the remainder of the flange and hence, there is no possibility of its coming loose or falling out of alignment. The upwardly upturned end flange 393 may solidly contact the end portion 345 of the rubber and engage it snugly when pushing it home.

Accordingly, this embodiment has the advantage of using only a single casing. There is no problem of fit between a molded surface and a formed casing, whether one is made from a steel stamped material or made from a plastic material as in the first embodiment. There is no possibility of misalignment. The force generated, even when considerable, cannot cause a failure or disconnection of the axial flange 391 in making the installation of the auxiliary seal 334.

Figure 7:
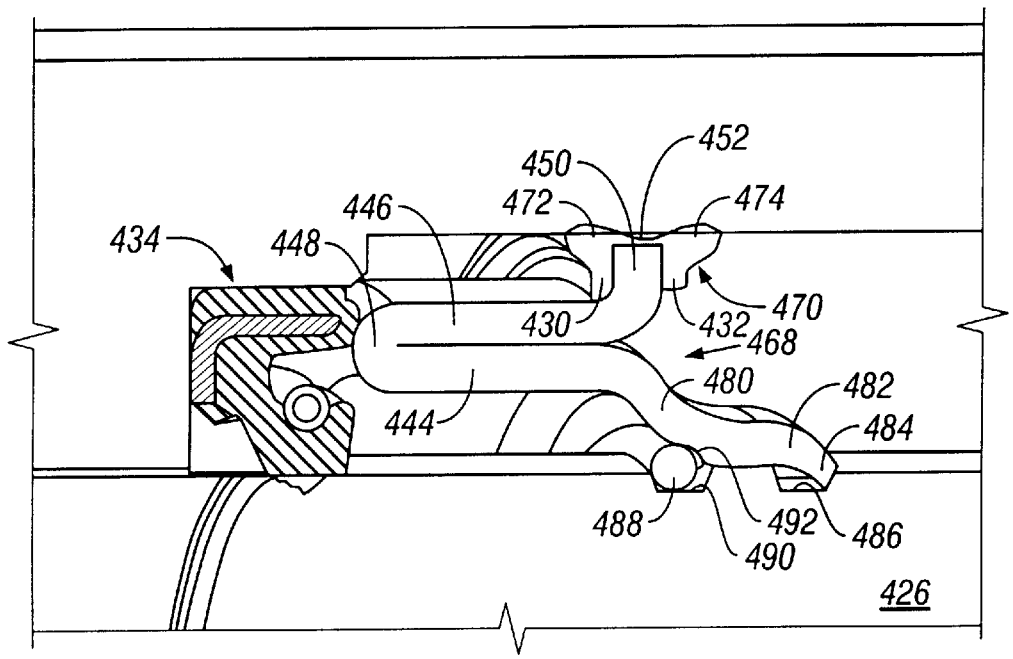
FIG. 7 is a partial perspective view showing a still further embodiment of the invention also using the stamping or casing as an installation aid for auxiliary seal at the end of the housing; and, FIG. 8 is a greatly enlarged fragmentary partial perspective view showing an improved version of the seal or piston having added thereto various beads to either side and the center portion of the sealing lip body of the invention.

FIG. 7 shows a still further variation of the invention. In this case, the rack 426 contains grooves 486, 490. These grooves utilize the reduced thickness tail portion 484 of the flange 482 swaged into the hollow groove 486 and the grooved portion 492 of the casing to engage the locking ring 488. However, the casing 468 includes a very abbreviated, partially radially extending flange 480. The flange then turns and extends axially outward a substantial length at 444, and folds back on itself to provide a slightly larger outside diameter flange 446. These flanges are folded upon themselves and the point at which they are folded they form a tip portion 448 for engaging the seal generally designated 434.

Near the end portion of the flange 446 lies a terminal or radially outwardly directed flange 450, and this flange serves as the bonding flange for the body generally designated 470 including the two lips 472, 474. Each of the lips 472, 474 includes a radially extending bonding portion 430, 432, respectively to create sufficient bonding for the lip portions. The center section 452 of the lip body 470 is also of sufficient strength that it is not subject to tearing.

The disadvantage of this construction is the somewhat difficult formation of the casing. However, it is relatively easy to mold the rubber portion comprising the lips 472, 474 in this construction. The nose portion 448 is large and can easily engage the auxiliary seal 434. The seal/piston functions exactly like its counterparts.

Figure 8:
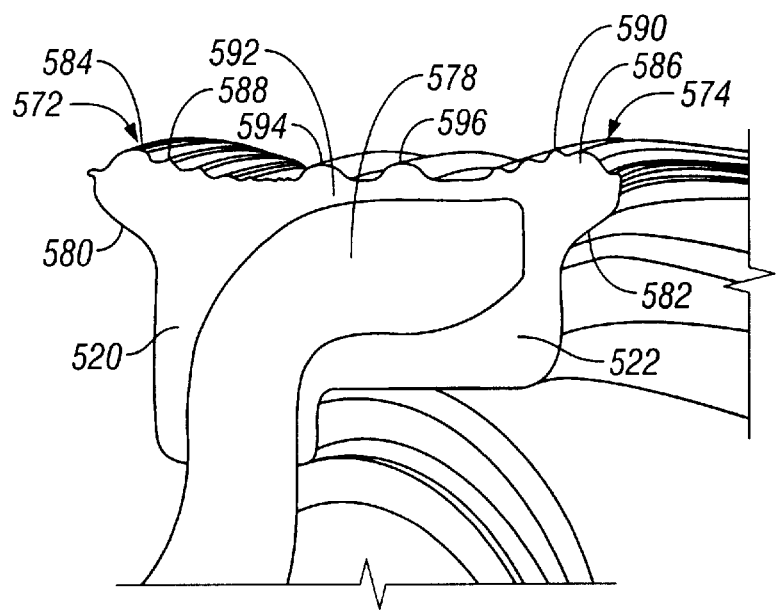

Referring now to FIG. 8, this is a greatly enlarged sectional view of the rubber portions of the lips generally designated 572, 574. Here, the axial flange 578 is shown, and there are body portions 520, 522 each of which has a good area of bonding. The lips include inside portions 580, 582, and outside contact areas 584, 586. Each of these contact areas includes plural ribs 588, 590 and the body area 592 intermediate these lips 572, 574 include enlarged bead portions 594, 596. These beads may be used with any of the embodiments of the invention, and they serve to distribute the sealing forces in a way which is advantageous from the stand point of wear and to avoid any sticking or other problems in use. The beads 594, 596 are shown as being somewhat larger, and these tend to steady the forces involved in this sealing. However, the beads may be of the same size or smaller than the beads on the lips if desired for some reason.

It will thus be seen that the present invention provides an improved seal or piston for a power steering system having a number of advantages and characteristics including those expressly pointed out herein, and others which are inherent in the invention. A few embodiments of the seal or piston of the invention having been shown and described in detail, it is anticipated that variations to the described form of apparatus will occur to those skilled in the art and that such modifications and changes may be made without departing from the spirit of the invention or the scope of the appended claims.

What is claimed is:

1. A seal assembly adapted to be received over a rod movable along a given axis, said seal assembly including an annular metal casing portion and an annular elastomeric body portion, said metal casing portion including a first, generally axially extending radially inner portion having a tail portion adapted to be swaged into a first groove in said rod and another portion adapted to overlie and snugly confine a locking ring received in a second groove, and a second portion for receiving said annular elastomeric body portion, said elastomeric body portion being bonded to said second portion, said elastomeric body portion further including a pair of oppositely directed lip portions separated by a reduced diameter intermediate portion, said seal assembly further including an annular, axially extending nose portion with an annular tip adapted to engage a portion of a second seal assembly and exert an axial force thereon to seat said second seal and allow said second seal to snugly engage the periphery of said rod, said second portion for receiving said elastomeric body portion comprising a radial flange and a second axial flange.

2. A seal assembly as defined in claim 1, wherein said elastomeric body includes, on a radially inwardly facing portion lying radially inwardly of said axial flange, a groove adapted to retain a portion of an annual member serving as said nose, said nose having a tip for engaging a portion of said second seal assembly.

3. A seal assembly as defined in claim 1, wherein said elastomeric body portion includes on a radially inwardly facing portion thereof, a cylindrical surface lying radially inwardly of said axial flange, with said nose portion snugly engaging said cylindrical surface.

4. A seal assembly as defined in claim 3, wherein said nose portion includes on an axially inner end thereof, a radial flange to distribute the axial load placed on said nose portion.

5. A seal assembly as defined in claim 3, wherein said portion includes an axially outer end thereof, a radial flange to engage said second seal assembly.

6. A seal assembly adapted to be received over a rod movable along a given axis, said seal assembly including an annular metal casing portion and an annular elastomeric body portion, said metal casing portion including a first, generally axially extending radially inner portion having a tail portion adapted to be swaged into a first groove in said rod and another portion adapted to overlie and snugly confine a locking ring received in a second groove, and a second portion for receiving said annular elastomeric body portion, said elastomeric body portion being bonded to said second portion, said elastomeric body portion further including a pair of oppositely directed lip portions separated by a reduced diameter intermediate portion, said seal assembly further including an annular, axially extending nose portion with an annular tip adapted to engage a portion of a second seal assembly and exert an axial force thereon to seat said second seal and allow said second seal to snugly engage the periphery of said rod, wherein said second portion for receiving said elastomeric body comprises first and second radial flanges, said first flange extending raidally outwardly and said second flange extending radially inwardly, said flanges being joined to each other by a bight portion.

7. A seal assembly as defined in claim 6, wherein said seal assembly further includes a second axial flange permanently affixed to said second radial flange, said second axial flange having an upturned end portion serving as said annular tip portion, said second axial flange serving as said nose portion of said assembly.

8. A seal assembly adapted to be received over a rod movable along a given axis, said seal assembly including an annular metal casing portion and an annular elastomeric body portion, said metal casing portion including a first, generally axially extending radially inner portion having a tail portion adapted to be swaged into a first groove in said rod and another portion adapted to overlie and snugly confine a locking ring received in a second groove, and a second portion for receiving said annular elastomeric body portion, said elastomeric body portion being bonded to said second portion, said elastomeric body portion further including a pair of oppositely directed lip portions separated by a reduced diameter intermediate portion, said seal assembly further including an annular, axially extending nose portion with an annular tip adapted to engage a portion of a second seal assembly and exert an axial force thereon to seat said second seal and allow said second seal to snugly engage the periphery of said rod, wherein said second portion includes a first axially extending flange portion, a second axially extending flange portion joined to each other by a bight portion, and a radial flange portion, said elastomeric body being bonded to said radial flange portion and said bight comprising said tip of said nose portion.

9. A two-piece seal assembly adapted to be received over a rod movable along a given axis, said seal assembly including a first piece comprising an annular metal casing portion and an annular elastomeric body portion, said metal casing portion including a first, generally axially extending radially inner portion having a tail portion adapted to be swaged into a first groove in said rod and another portion adapted to overlie and snugly confine a locking ring received in a second groove, and a second annular metal casing portion comprising a radially extending portion and an axially extending portion for receiving said annular elastomeric body portion, said annular elastomeric body portion being bonded to both said radially extending portion and said axially extending portion of said metal casing portion, said elastomeric body portion further including a pair of oppositely directed lip portions separated by a reduced diameter intermediate portion, said seal assembly further including a separate annular axially extending nose portion with an annular tip adapted to engage a portion of a second seal assembly and exert an axial force thereon to seat said second seal and allow said second seal to snugly engage the periphery of said rod, said separate nose portion snugly engaging said annular elastomeric body portion so as to hold said nose portion in place.

10. A two-piece seal assembly adapted to be received over a rod movable along a given axis, said seal assembly comprising a first piece including an annular metal casing portion and an annular elastomeric portion, said metal casing portion including a first, generally axially extending radially inner portion having a tail portion adapted to be swaged into a first groove in said rod and another portion including a groove overlying and snugly confining a locking ring received in a second groove, said first piece including a radial flange and an axial flange for receiving an elastomeric body portion, said annular elastomeric body portion including a pair of oppositely directed lip portions separated by a reduced diameter intermediate portion, and a portion of said elastomeric body portion lying radially inwardly of said lip portions and being adapted to receive and position a second piece, said second piece comprising an axially extending body portion having a tip engaging an auxiliary seal to exert an axial force thereon to position said auxiliary seal in a counter bore and cause said auxiliary seal to snugly engage the periphery of said rod.

11. A two-piece seal assembly as defined in claim 10, wherein said portion of said elastomeric body portion comprises a grooved element, and said axially extending body portion includes a rib for engaging said grooved element.

12. A two-piece seal assembly as defined in claim 10, wherein said portion of said elastomeric body portion lying radially inwardly of said lip portions comprises a portion sized to create an interference fit with said axially extending portion.

13. A two-piece assembly as defined in claim 12, wherein said second piece is a metal element.

14. A two-piece seal assembly as defined in claim 13, wherein said second piece includes a radial flange on each end thereof.

15. A two-piece seal assembly as defined in claim 10, wherein said second piece is a plastic material.

16. A one-piece seal assembly adapted to be received over a rod portion movable along a given axis, said seal assembly comprising an annular metal casing portion and an annular elastomeric body portion, said metal casing portion including a first, generally axially extending, radially inner portion having a tail portion adapted to be swaged into a first groove in said rod and another portion including a groove overlying and snugly confining a locking ring received in a second groove, a further portion including an axial flange having a tip adapted to engage an auxiliary seal and apply a seating force thereto causing said auxiliary seal to be seated in a counter bore and to seal the periphery of said rod portion, and a portion lying intermediate said tail portion and said tip of said axial flange for receiving an annular elastomeric body portion, said portion including both axial and radial components, and an annular elastomeric body portion bonded to both components of said intermediate portion, said annular elastomeric body portion including a pair of oppositely directed lip portions of the same diameter separated by a reduced diameter intermediate elastomeric portion wherein said portion of said casing lying intermediate said tail portion and said tip of said axial flange comprises a radial flange to which said annular elastomeric body portion is bonded, said axial flange comprising radially inner and outer axially extending flanges folded back on themselves.

* * * * *